Dec. 12, 1961 R. E. REESE 3,012,813
TRUCK BODY COVER HAVING FOLDABLE, HINGED PANELS
Filed Jan. 4, 1960 3 Sheets-Sheet 1
Fig. 1.
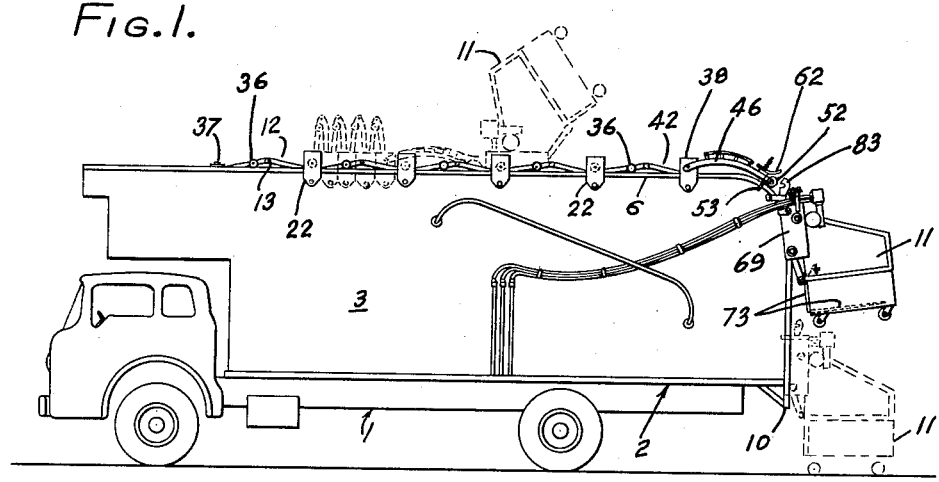
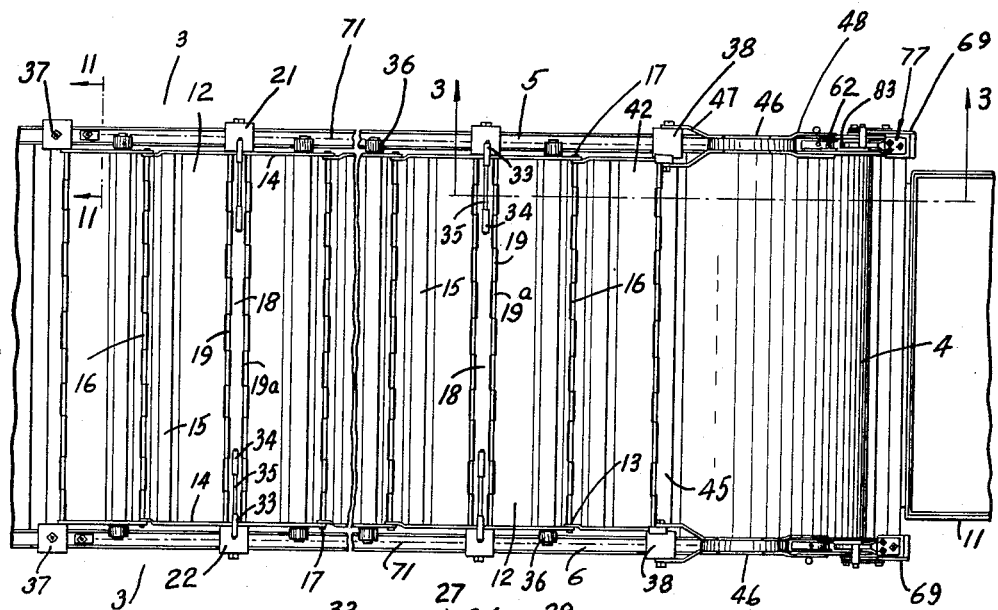
Fig. 2.
Fig. 10.
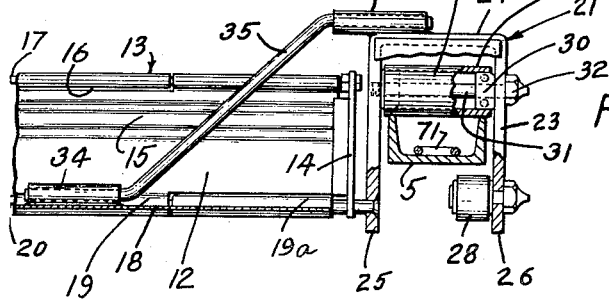
INVENTOR,
RAYMOND E. REESE;
BY
ATTORNEY Dec. 12, 1961 R. E. REESE 3,012,813
TRUCK BODY COVER HAVING FOLDABLE, HINGED PANELS
Filed Jan. 4, 1960 3 Sheets-Sheet 2
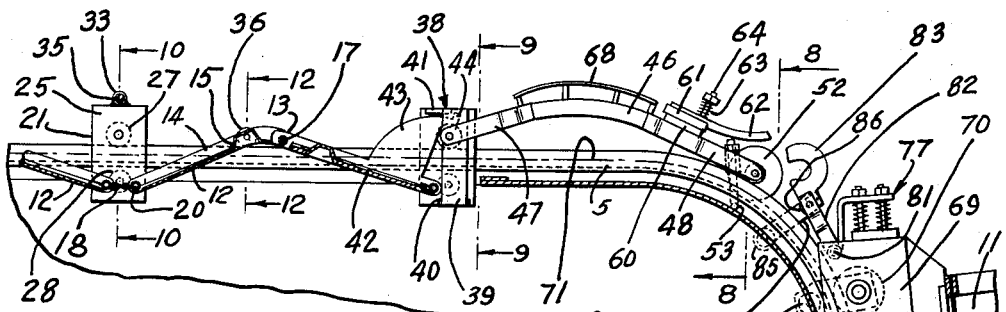
FIG. 3.
FIG. 6.
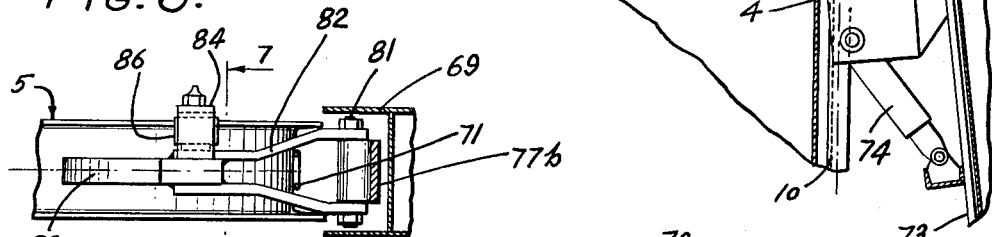
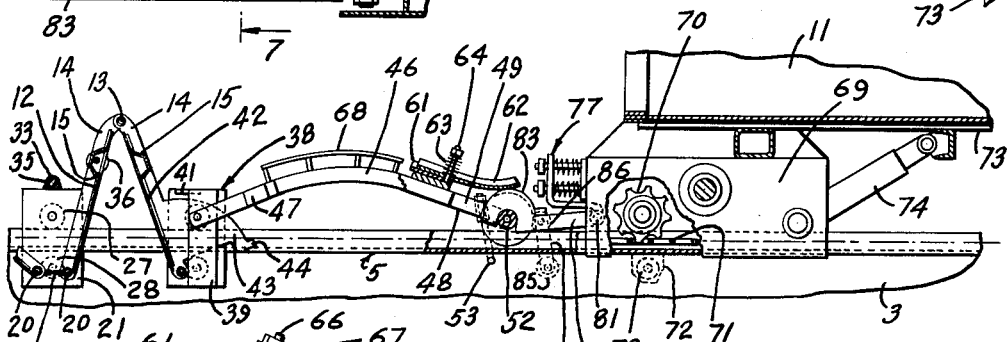
FIG. 4.
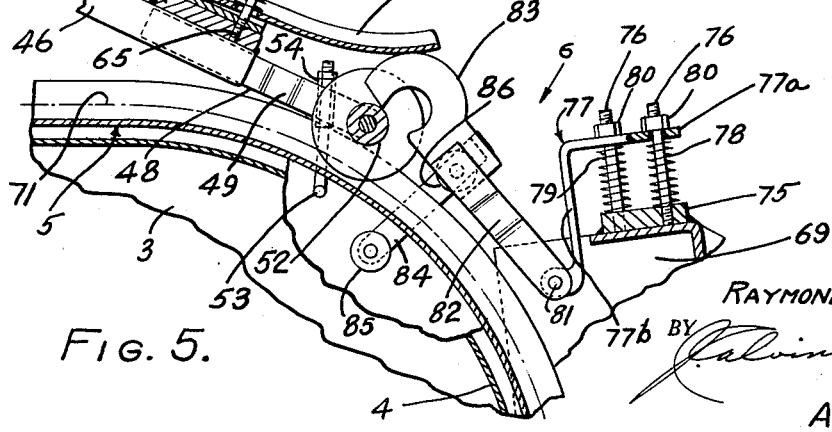
FIG. 5.
INVENTOR,
RAYMOND E. REESE;
BY
ATTORNEY Dec. 12, 1961  R. E. REESE  3,012,813
TRUCK BODY COVER HAVING FOLDABLE, HINGED PANELS
Filed Jan. 4, 1960  3 Sheets-Sheet 3

INVENTOR,
RAYMOND E. REESE;
BY
Calvin Brown,
ATTORNEY

United States Patent Office 3,012,813
Patented Dec. 12, 1961

3,012,813
TRUCK BODY COVER HAVING FOLDABLE, HINGED PANELS
Raymond E. Reese, 1448½ Orange Grove Ave., Los Angeles, Calif.
Filed Jan. 4, 1960, Ser. No. 411
10 Claims. (Cl. 296—100)

The present invention relates to truck covers. The invention provides a truck cover for open bed truck bodies for the purpose of closing the load carrying space thereof. Trucks of this type are provided with end and side walls which form an enclosure for the truck bed.

An object of the invention is to provide a collapsible type cover for a truck which may operate in conjunction with a bucket in such a manner that the bucket may be moved to different overhead positions relative to the truck body and in so doing fold the cover so as to leave an open space for the dumping of material from the bucket into the truck. With respect to this object, the bucket may be moved by suitable means toward the rear end of the truck and while so moving, the collapsible cover is likewise moved to progressively enclose the truck top.

A further object is the provision of a cover for trucks which is fool proof in operation, superior to truck covers now known to the inventor, inexpensive in cost of manufacture, which is adaptable to trucks now in existence or which may be initially incorporated into the truck construction during its manufacture, easily operated and positive in its action.

With the above mentioned and other objects in view, the invention consists in the novel and useful provision, formation, construction, association and relative arrangement of parts, members and features, all as depicted in certain embodiments in the accompanying drawings, described generally, and more particularly pointed out in the claims.

In the drawings.

FIGURE 1 is a side elevation of a truck, the body of which incorporates the invention;

FIGURE 2 is a fragmentary top plan view of the truck cover shown in FIGURE 1, and on an enlarged scale;

FIGURE 3 is a fragmentary sectional view on the line 3—3 of FIGURE 2, and on an enlarged scale;

FIGURE 4 is a fragmentary sectional view similar to the sectional view shown in FIGURE 3, certain parts being in changed position;

FIGURE 5 is a fragmentary sectional view on an enlarged scale, of the cover latching and unlatching mechanism;

FIGURE 6 is a fragmentary sectional view looking in the direction of the arrow 6 of FIGURE 5;

FIGURE 10 is a fragmentary, partially sectional view taken on the line 10—10 of FIGURE 3, and on an enlarged scale;

Figure 7:
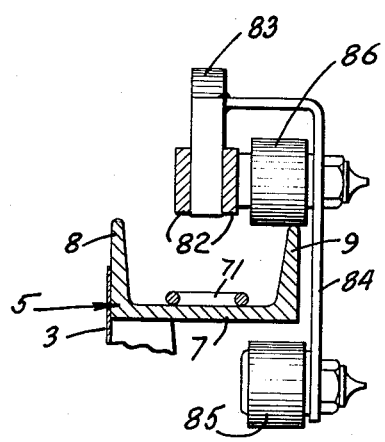
FIGURE 7 is a fragmentary sectional view on the line 7—7 of FIGURE 6, and on an enlarged scale.

Referring now to the drawings. In FIGURE 1 I have illustrated in side elevation a truck 1 of the open bed type 2, a pair of side walls 3 one of which is shown, the other being of like configuration, and which have front and rear ends. In FIGURE 3, the rear end is shown at 4 and the front end overlies the truck cab, in the truck shown. It is, of course, obvious that open bed trucks have different configurations and if the truck is of any length, the truck is usually detachable from the cab portion. The truck shown has an open top so as to provide a space for receiving material between the side and end walls. This type of truck allows a gradual building up of material therein and usually has a great carrying capacity. In certain types of trucks, it is essential that the open top of the truck be covered. This is particularly true of garbage trucks and may be true for trucks which carry various commodities such as grain, not only to protect the grain from the weather, but likewise to prevent the grain from being blown from the truck during truck movement.

Figure 8:
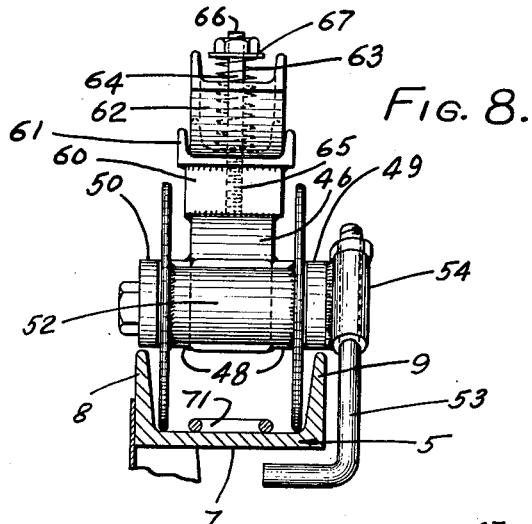
FIGURE 8 is a fragmentary sectional view taken on the line 8—8 of FIGURE 3, and on an enlarged scale.

In the present invention I provide a plurality of panels which extend transversely between the sides 3 of the truck and which panels are interconnected by hinges so that the said panels may be folded together to provide a large open space at the top of the truck, or may be extended so as to completely cover the top of the truck. My construction is such as to allow for a positive opening and closing of the panels in a minimum time. To accomplish this, the sides 3 of the truck, as well as the end 4, are both provided along their marginal edges with separate tracks at 5 and 6, which tracks are of channel form, as best illustrated in FIGURES 7 and 8. Such channel form provides a track base 7 and two parallel flanges 8 and 9 secured to the base. As stated, tracks of this character are provided for the top of each side 3 and for the end 4, and may extend below the bed 2 of the truck as shown, for instance, in FIGURE 1 at 10. The tracks for the end 4 are used with means for elevating a bucket 11 and guiding movement thereof over the top of the truck as hereinafter set forth.

To cover the top of the truck, I have provided a plurality of transverse panels designated generally as 12 (FIGURES 2, 3, 4). These panels may be formed of any material desired, although I prefer to use steel or other suitable metal, and contiguous edges of pairs of the panels are hinged together, as shown at 13 in FIGURE 4. The panels are substantially identical in construction, which is to say, each panel is flanged at its sides, as shown at 14, and each panel is provided with an elongated stiffening rib 15 which extends between the flanged sides thereof. In the construction shown, the stiffening rib 15 is spaced inwardly from the hinge point joining a pair of panels, as shown in FIGURE 4. Hinging the edges of a pair of panels together is accomplished by providing spaced knuckles 16, FIGURE 2, along the contiguous edges of each panel, then passing an elongated pin 17 through said knuckles and side flanges. The opposite elongated edge of each panel of a pair is secured to a hinge leaf 18, FIGURE 2, which leaf is provided along each longitudinal edge thereof with spaced knuckles 19, and the panels 12 have spaced knuckles 19a which are received between the knuckles 19, the knuckles being pinned together by an elongated transverse pin 20, (FIG- URES 3 and 4). Each hinge leaf 18 is secured between a pair of aligned parallel trolleys 21 and 22. These trolleys ride upon the tracks 5 and 6, see FIGURES 2 and 10. As the trolleys are identical in construction, one thereof will be described, the same reference characters applying to the other trolley. Trolley 21, referring to FIGURE 10, has an inverted U-shape frame 23 providing a top 24 and two spaced parallel legs or sides 25 and 26. The legs are adapted to straddle the flanges of the track 5. Between the legs and secured thereto for rotation, is a roller 27, the roller riding on the top edges of the flanges of the track 5. Carried by the leg 26 and beneath the base 7 of the track 5, is a roller 28 which I term a "hold down roller." Roller 28 is spaced slightly beneath the base of the track so that there may be limited vertical movement of the trolley.

Figure 12:
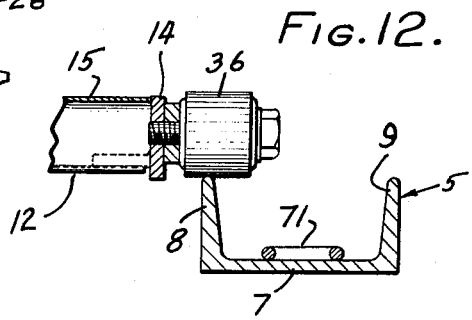
FIGURE 12 is a fragmentary sectional view on the line 12—12 of FIGURE 3, and on an enlarged scale.

While roller construction may vary, the roller shown at 27 consists of a tubular tread member 29 suitably carried on cylinders 30 adjacent the ends of the tread, the cylinders in turn are mounted upon a central rod or axle 31, one end of which axle is threaded in leg 25, the opposite end being passed through leg 26, with the assembly held by nut 32 secured to the rod or axle. The elongated pin 20 which interconnects the hinge leaf knuckles 19 with the kunckles 19a of the panels 12 is in turn passed through the legs 25 of each parallel aligned trolley 21 and 22. The top 24 of each trolley is provided with a transverse sleeve 33 and the hinge leaf 18 is also provided with a sleeve 34 which is parallel and in alignment with the sleeve 33, there being a stabilizing rod 35 provided with offset parallel ends which are received within the confines of the sleeves 33 and 34. This rod acts to stabilize the panel structure relative to the trolleys when the panels are folded, as shown by dotted lines in FIGURE 1, or when in extended position. The trolleys form means for supporting one side of a hinged pair of panels and to support the panels at their hinged line 13. One of the panels is provided with rollers 36 secured to flanges 14, see FIGURE 12, which ride on the top edge of the inner leg of the tracks 5 and 6.

To review the structure so far described, a pair of panels 12 are hinged together at their contiguous longitudinal edges with one of the panels carrying end rollers 36 adjacent the hinge point which rollers, for each side of the panel, ride upon the tracks 5 and 6. The opposite longitudinal edges of said hinged pair of panels are, in turn, hinged to hinge leaves with both the panels and the hinge leaves provided with knuckles through which pins are passed with ends of the said pins secured to trolleys which ride upon the tracks 5 and 6.

Figure 9:
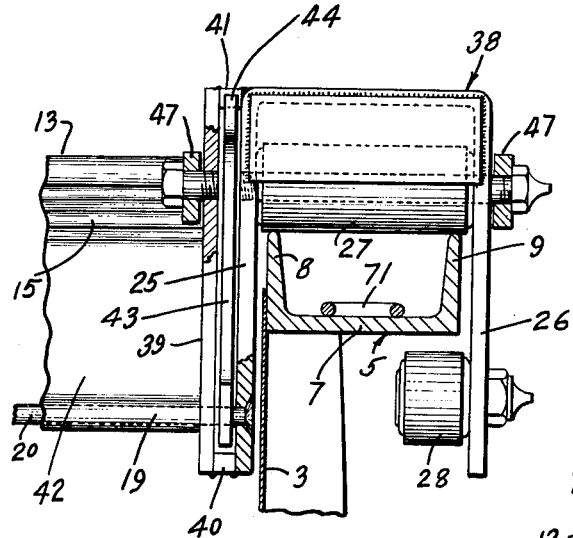
FIGURE 9 is a fragmentary sectional view on the line 9—9 of FIGURE 3, and on an enlarged scale.
Figure 11:
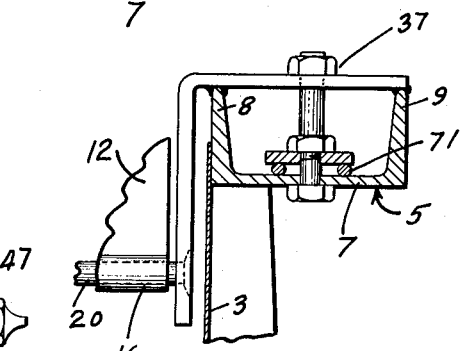
FIGURE 11 is a fragmentary sectional view on the line 11—11 of FIGURE 2, and on an enlarged scale.

The method of attachment just outlined will prevail for the remaining pairs of panels regardless of the number used, which will vary in accordance with truck size. It is to be observed that the connection of the hinge leaf between pairs of trolleys is such as to position ends of the panels below the tracks 5 and 6 while the rollers 36 which ride upon the tracks elevate the panels and hence the connected pairs of panels are at an obtuse angle, see FIGURES 1 and 3. One panel of a pair of the panels of a connected series of panel pairs, is anchored to the truck body, and in the present instance is shown in FIGURE 1 as over the cab section at 37. The opposite end panel of joined pairs of panels is connected to a trolley 38 of slightly different construction from the trolley 21, as illustrated in FIGURE 9. There are two trolleys 38, one for each side of the truck and these trolleys follow the construction of trolley 21 with the exception that each trolley 38 carries a side plate 39 held spaced by separators 40 and 41 from the side leg 25. Side plate 39 is not as wide as the leg 25, as illustrated in FIGURE 3. The last hinged panel 42 of the group of panels, has its end flanges so formed as to provide wing type limit stop members 43. Each limit stop member 43 is provided with an abutment 44 which strikes a separator 41 when the panels are in extended position, as shown in FIGURE 3, and thus holds the last two pairs of hinged-together panels in acute angle relationship. A hinge leaf 45 is carried between the pair of aligned trolleys 38, which hinge leaf is provided along one edge with spaced apart kunckles which receive therebetween spaced apart kunckles of the panel 42 and through which kunckles is passed a pin for joining the same together.

Each trolley 38 has connected thereto what I term a radius arm 46. This radius arm is on an arc and carries at each end a forked member 47 and 48. The forked member, in each instance, is formed by providing two bars 49 and 50, having offset parallel ends with interconnecting pieces. The forked member 48 has mounted between the bars thereof, a flanged roller 52, see FIGURE 8. The flanges of the roller are of disk like form and are received between the flanges 8 and 9 of each track 5 and 6. Each fork member 48 carries a limit stop member 53 comprising an L-shaped rod, the longest leg of which is passed through a sleeve 54 which sleeve is secured to one of the bars 49 of the forked member 48. The shortest leg of said limit stop member is positioned beneath the base 7 of a track 5 or 6. The arrangement is such that there is a spacing between the track base 7 and the shortest leg of the limit stop member. Carried by the radius arm 46, and on top thereof adjacent the fork 48, is a spacer bar 60 (FIGURE 5) to which is connected a channel member 61 and received between the flanges of the channel member 61 is a longitudinally arcuate channel member 62 which I term a cam bar. Member 62 extends forwardly of the spacer bar 60. The cam bar 62 is capable of movement under restraint provided by a coil spring 63 which surrounds a bolt 64, one threaded end 65 of which is threaded to the members 60 and 61, while the opposite threaded end 66 carries a nut and a washer combination 67 for compressing the spring 63 between the washer and the base of the cam bar 62, it being observed that the bolt is passed through an enlarged opening in the base of said cam bar.

As incidental to the construction of the radius arm, I have provided a reinforcement therefor at 68 which comprises a fence like member secured to the top of the arcuate portion of said arm.

I have provided at 69 what I term an accumulator, mobile power unit, or car. This particular unit is used for elevating or lowering the bucket 11 relative to the one end of and for movement over the top of the truck. I have not detailed the entire construction of the accumulator other than to state that it is movable relative to the tracks 5 and 6, there being two of said units one for each side of the truck, and said units are driven either hydraulically, by electric power, or by other means. In the present instance the casing for the accumulators in each instance houses a power driven gear or pinion 70 which engages the links of a chain 71 functioning as a rack, there being a chain confined within each track 5 and 6. A chain in each instance is fastened to the base of a channel type track with the result that the accumulator will move progressively along said chain. To maintain the accumulators on the tracks, the casings thereof are provided with side brackets designated generally as 72, which side brackets are provided with rollers 72a positioned beneath the tracks. Each accumulator is so constructed as to carry one or more fork arms 73 (FIGURE 3), two being provided in the present instance, one leg thereof being secured to the accumulator while the opposite leg, at a right angle thereto, is adapted to be positioned beneath the bucket 11 for lifting the bucket. In addition, each accumulator is provided with a hydraulically actuated arm 74 so that the bucket may be tipped from the full line position of FIGURE 1 to the dotted line position shown for the top of the truck in the same figure.

The forward end of the casing for each accumulator carries a reinforcement block 75 to which is threaded a pair of bolts 76, the said bolts securing one leg of an angle bracket 77, there being coil springs 78 and 79 surrounding the bolts 76 and interposed between the block 75 and one leg 77a of the bracket, with the assembly secured by nuts designated generally as 80 externally positioned on the leg 77a of the bracket. The construction is such that the bracket as an entirety may be rocked relative to the bolts 76 to compress the springs. The opposite leg 77b of the bracket is hinged at 81 to arm 82, the arm 82 being provided with a C-type connector clamp or hook 83 the opening of which faces the track 5. In the construction shown, the arm 82 is provided with a bracket arm 84 carrying spaced apart rollers 85 and 86, see FIGURE 5, the roller 85 being spaced beneath the track 5 while the roller 86 is spaced above the track to the end that the arm may rock back and forth and still be limited in its swinging motion. As shown in FIGURES 3 and 5, the arm 82 will assume the position of FIGURE 3 as the accumulator 69 moves upwardly, the arm being swung to the position of FIGURE 5 when the C-type clamp strikes the convex face of the cam bar 62 to move the C-type clamp downwardly into engagement with the hub of the roller 58 to lock the accumulator to said roller and radius arm 46.

The operation, uses and advantages of the invention just set forth, are as follows.

I assume first that the truck has the top covered, which is to say the panels are all extended as shown by the full line position of FIGURE 1. In this position each pair of interconnected hinged panels is at a slight obtuse angle. The bucket 11 which is usually mounted on base rollers, is moved to a position at the end of the truck so that the lifting forks 73 may engage the base thereof. As a rule, the bucket will be secured to the two accumulators 69 so as not to be accidently detached therefrom. When the accumulators are actuated, the pinions 70 are rotated for travel along the links of the chains 71. As the accumulators raise the bucket, as for instance from the dotted line ground position for the bucket to the full line position at one end of the truck in FIGURE 1, both accumulators follow the end curvature of the tracks 5 and 6 so that the hook or clamp ends 83 for each accumulator, is brought into engagement with the cam bar 62 to cam the clamps into engagement with the hubs of the rollers 52 for both sides of the truck. The accumulators continue their movement, and due to the latched connection between the accumulators and the rollers 52, the radius arms 46 for each side of the truck will commence movement toward the forward end of the truck and in so doing will cause relative movement between the first set of hinged panels, being that set shown in FIGURE 3. When this occurs, the limit stop members 43 will be moved from the position of FIGURE 3 to that of FIGURE 4 and it will be observed from FIGURE 9, said limit stop members are positioned between the legs 25 and the plate 39. The two panels will then move to the position of FIGURE 4 which may be termed a folded position followed by movement of the next adjacent pair of panels as the accumulators move forwardly toward the cab on the horizontal tracks 5 and 6. In this way all of the pairs of panels may be folded to the position shown in dotted lines in FIGURE 1, to completely open the top of the truck. Upon retrograde movement of the accumulators, the accumulators retrace their movement and in so doing the pairs of panels progressively move from folded form to extended position and when the radius arm reaches the position shown in FIGURE 3, the panels stop further movement, the C-type clamps or hooks of the latching elements 83 will release from the hubs of each flanged roller 52 and continued downward movement of the accumulators will position the bucket on the ground, as shown in FIGURE 1.

The latching means for interconnecting an accumulator with a radius arm, is thought to be novel as it is automatic in its operation and not subject to failure, largely due to the spring connection of the bracket 77 with the accumulator casing through the hinge 81 which allows this member to move in case there is any wedging action and to thereby positively release latch engagement with a flanged roller 52. In this respect, the cam bar is also capable of movement, such movement being controlled by the spring 63. By arranging the pairs of interconnected panels so that they subtend an obtuse angle when covering the top of the truck, I am assured that the panels will at all times extend or fold without failure. It is evident that if the panels assumed a straight line formation or lay in a single plane, that difficulty would be encountered in this regard. Furthermore, the trolleys 21 are capable of rocking motion back and forth on the tracks to compensate for movement of the panels.

In every case, I have provided safety means comprising the upper and lower rollers positioned relative to the tracks to assure that there will be no jumping action of the parts and that all parts will function smoothly and efficiently.

I claim:

1. A cover for an open bed truck of the type which has side walls having front and rear ends, including: a track for each side wall positioned adjacent the top edge thereof and extending along the rear ends of the side walls of the truck, panels hinged together in pairs, transversely extending between the side walls, trolleys mounted for movement in aligned transverse pairs on each track and positioned between the front and rear end walls, and means extending between each pair of aligned trolleys for hinging the outermost edges of each pair of panels thereto, and means for moving the trolleys to fold or extend each pair of panels at the hinge connections.

2. The combination of claim 1, rollers secured to one panel of each pair of panels mounted for movement on the top of each track and the first named means being positioned beneath both tracks to thereby maintain each pair of panels in obtuse angle relationship when the panels are extended.

3. The combination of claim 1, and means for maintaining each hinged pair of panels in obtuse angle relationship.

4. The combination of claim 1, one of said panels of a pair of panels being hinged to the truck adjacent the front ends of the side walls to maintain the panel against translational movement.

5. The combination set forth in claim 1, the trolleys proximate to the rear end of the side walls of the truck each provided with a radius arm mounted at one end thereto for swinging movement in a vertical plane, a roller carried by the outermost end of each radius arm, and the second named means formed for latch engagement with each radius arm roller.

6. The combination set forth in claim 1, the second named means icnluding power units mounted for movement on each track, and latch means carried by each power unit for detachable engagement with a trolley proximate the rear ends of the side walls of the truck.

7. The combination set forth in claim 1, radius arms swingingly secured to the pair of trolleys which are proximate the rear ends of the side walls of the truck, a cam bar mounted on each radius arm, a roller for one end of each radius arm and positioned beneath each cam bar, the second named means comprising a power unit on each track for movement thereon, and a latch carried by the power unit and engageable with said cam bar to move the latch into engagement with rollers carried by each radius arm to secure the same thereto.

8. The combination set forth in claim 7, each power unit through its latch moving the radius arm and the assembled pairs of panels so as to fold said panels and thereby open the top of the truck.

9. A truck cover for open bed truck bodies, the body having a pair of side walls having rear ends, including: a track extending along the top of each side wall and along the rear end, a series of trolleys for movement on each track, the trolleys being oppositely positioned on the tracks, each trolley including a frame, a roller carried by each frame for movement upon a track and a roller for the frame positioned beneath the track, a pair of hinged together panels transversely extending between the sides of the truck body, hinge leaves transversely extending between aligned pairs of trolleys and positioned beneath the tracks, the outermost edges of each hinged together pair of panels being hinged to said hinge leaves and each hinge leaf being secured between two trolleys one on each track, movement of said trolleys on said tracks folding each pair of panels to open the truck body, or to extend the panels over the truck body.

10. The combination of claim 3, there being stabilizing bars interconnecting each aligned trolley with a hinge leaf.

References Cited in the file of this patent
UNITED STATES PATENTS

| | | |
|---|---|---|
| 935,431 | Tackman | Sept. 28, 1909 |
| 2,086,091 | Payette | July 6, 1937 |